July 20, 1926.
M. H. ROBERTS
1,593,268
FLEXIBLE CONNECTION
Filed June 23, 1921 2 Sheets-Sheet 1
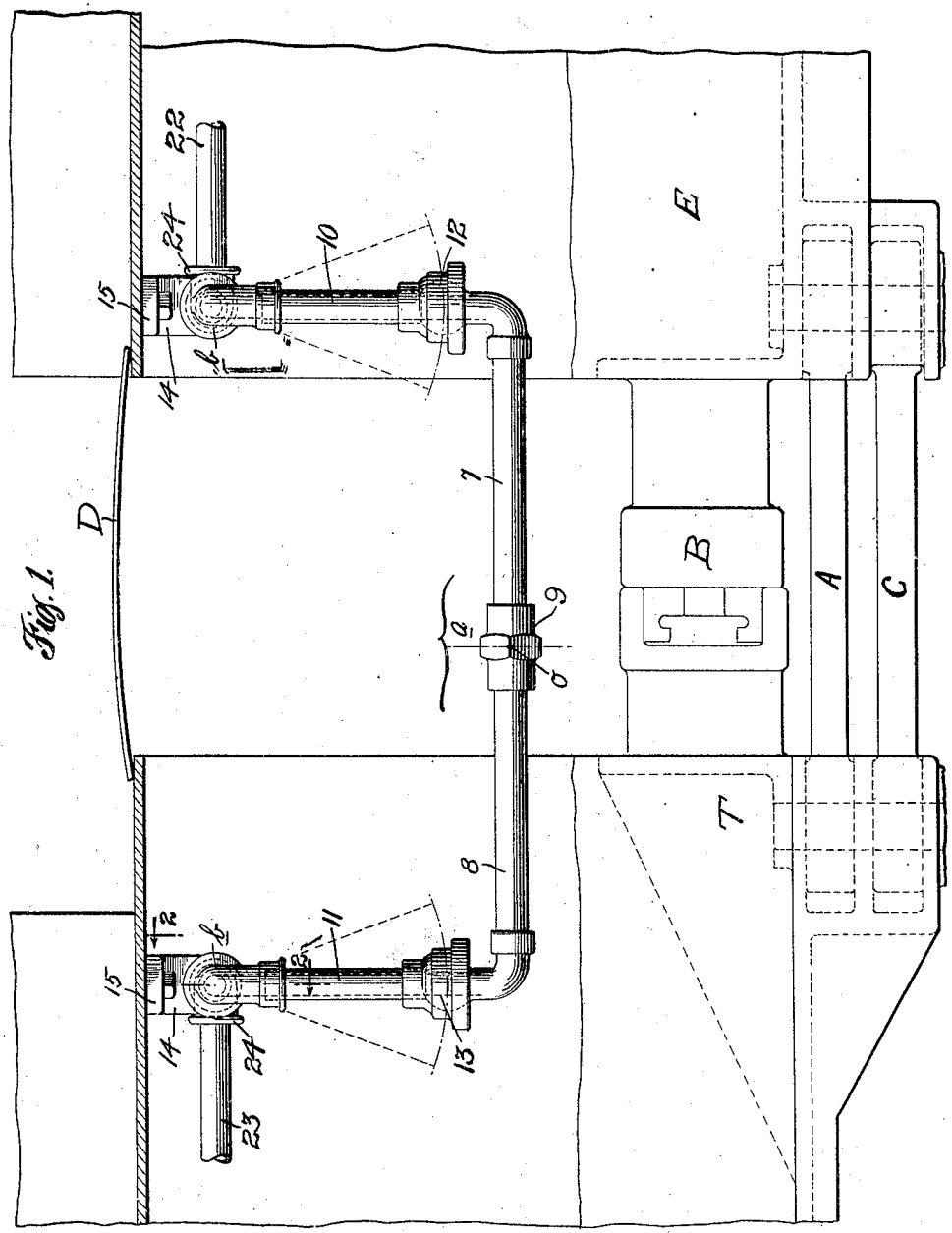

July 20, 1926.
M. H. ROBERTS
FLEXIBLE CONNECTION
Filed June 23, 1921
1,593,268
2 Sheets-Sheet 2
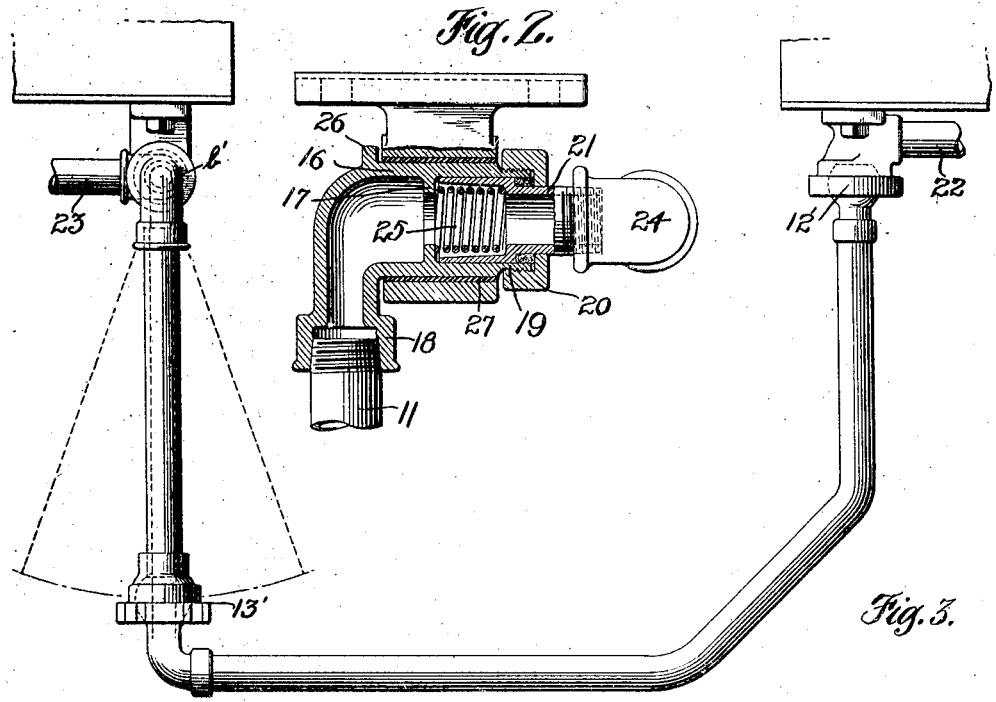
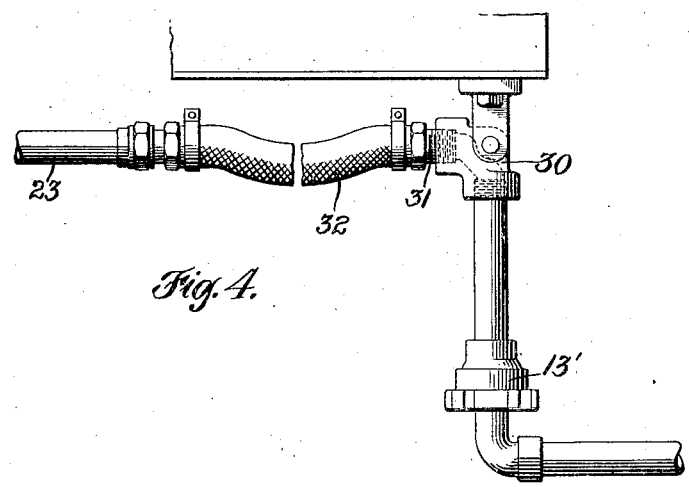
INVENTOR
Montague H. Roberts
BY
Hynnestvedt & Lechner
ATTORNEYS Patented July 20, 1926.

1,593,268

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

FLEXIBLE CONNECTION.

Application filed June 23, 1921. Serial No. 479,781.

This invention relates to the flexible metallic joints or connections employed between railway vehicles for conducting steam compressed air or water and it is especially useful between locomotive and tender.

Heretofore, in this art, the connections have been of two general types, one in which the lengths of pipe have been connected with ball and socket universal joints and another in which the lengths of pipe have been connected with rotatable sleeve or swivel couplings. Both forms are expensive, although not in like degree and there are other objectionable features. For example, in the old ball and socket or universal type the connection, if accidentally pushed out of its normal vertical position and swung laterally on its upper universals, will remain in such position, being held by the frictional resistance of the balls in their sockets with pressure in the line. The operation of such a connection is thus liable to be impared. Again if there is no pressure in the line, as for example, in summer in the steam line, the lateral sway or roll of the locomotive and tender sets up a swinging or pendulum motion of the connection on its upper balls which causes rapid wear. One of the disadvantages of the other type is that so many joints are required to meet service conditions that the cost is too great.

One of the primary objects of my invention is to provide an improved connection in which the foregoing and other disadvantages hereinafter pointed out are overcome.

Another object is to provide a connection requiring minimum vertical dimension thus affording maximum clearance. More specifically in this regard, my invention contemplates an improved connection which may be located in or above the plane of the draw bar.

Still another object is to provide a connection, parts of which may be readily replaced by the ordinary hose connection in case of a joint failure with no spares available; and this in such manner that the hose lengths are not kinked or bent.

My invention further contemplates a connection embodying improvements whereby the range of application of the connections is greatly extended.

The foregoing together with such other objects as may hereinafter appear or are incident to my invention, I attain by means of a construction which I have illustrated in preferred form in the accompanying drawings, wherein—

Fig. 1 is a side elevation of a connection embodying my improvements and illustrating its application; Fig. 2 is a section through one feature of my invention; Fig. 3 is a side elevation of a modification of my invention; and Fig. 4 is a fragmentary illustration of another modification.

In Fig. 1 is shown the buffer mechanism B between an engine frame E and its tender frame T with the deck plate D thereabove and the draw bar A and unit safety bar C below.

Referring now to Figs. 1 and 2, it will be seen that the connection there shown comprises a substantially horizontal pipe section $a$, composed of two lengths 7 and 8 coupled by a union 9; two substantially vertical pipe sections 10 and 11 respectively suspended from the engine and tender by means of a swivel joint indicated as a whole by the letter $b$; and the two universal joints 12 and 13, which are preferably of the ball and socket type.

The swivel joints $b$ consist of a bracket 14 having a base 15 for attachment; a hollow elbow member 16 which is swivelled in the bracket, is internally shouldered at 17 and has the end 18 of its vertical portion internally threaded to receive the threaded end of the respective pipe section 10 or 11, and has the end 19 externally threaded to receive the combined positioning nut and packing retaining cap 20; and the shouldered internal sleeve member 21, mounted within the elbow and having its outer end threaded for connection with the respective pipe line 22 or 23 of the engine and tender, as by means of the elbow 24. A packing ring is retained by the cap 20 and the spring 25 and the confined pressure acting on the sleeve 21 hold the packing tight. This spring is interposed between the sleeve and the shoulder 17. The elbow is positioned in the bracket by the flange 26 and the nut-cap 20. The bracket is preferably provided with a sleeve 27 composed of a self lubricating material of any suitable character.

It will be observed that the elbow is its own pivot pin and that the axis of rotation of the elbow in the bracket and on the sleeve is in a plane transverse the locomotive and tender, i. e., transverse the longitudinal vertical plane of the connection. The upright pipe sections 10 and 11 are, therefore, free to swing about such axis but they are substantially restrained from other swinging movement. The combination of the two sets of joints permits the sections to shift and compensate for movement of the locomotive and tender toward and from each other, for relative movement of the locomotive and tender up and down, and for curving movements.

The ball joints take care of the up and down movements, which are the most frequently recurrent, practically alone, and the vertical sections remain in approximately parallel relation save during curving or when the distance between locomotive and tender varies. This is because the center of rotation of the connection, taken as a whole during up and down movements is for the most part midway of the section $a$ at the point marked $o$, for ordinarily when the locomotive drops somewhat it is equivalent to the tender rising. Thus compensating movement is, ordinarily, not localized at one end of the connection but divided more or less equally, and the swinging movement of vertical sections, if any, is hardly noticeable which means that rotary movement of the elbow is for all practical purposes next to nothing. Even when the vertical sections swing during curving or lengthening or shortening of the distance between locomotive and tender, the movement of the elbow is small, usually not more than ⅛ of an inch and seldom much more. Thus wear on the working parts of the swivel joints and of the packing is negligible and the liability of the development of leakage is slight. The wear of the ball joints is also greatly reduced as they are in line with the vertical sections, which ensures an even distribution of the load over a maximum area.

As compared with ball and socket or other universal joints, the swivel joints are much cheaper both in material and construction, and they overcome the disadvantageous feature of the lateral swaying of the universal joint type of connection under rolling movements, and thus prolong the life of the connection. The connection is also always maintained in proper operative position.

As compared with an all swivel joint metallic connection, the connection is much less expensive and overcomes other difficulties encountered therein.

The connection also permits of the substitution of the ordinary hose connection in case of a failure, by simply unscrewing the pipes 10 and 11; and in this regard it is to be observed that the swivels will permit the hose lengths to make their own centers, without bending or kinking.

Sufficient flexibility to meet all service conditions can also be obtained with comparatively short lengths of vertical pipes which makes it possible to apply the connections in or above the plane of the drawbar, as shown in Figure 1, which is a feature of great practical advantage. The cheapness of the connection is also such as to make it feasible, in a metallic connection of this character to employ the union 9 which permits of uncoupling without disturbing the joints.

It is further to be observed that the brackets can be hung in the position shown or they may be extended longitudinally of the vehicles in an inclined direction, and still the swivels will function properly. From this and the following it will be seen that the connection has a wide range of application.

In the arrangement of Fig. 3, I have shown an inexpensive form of connection suitable for stoker fired or other locomotives in which it is unsuitable to locate the connection above the draw bar. This connection has only three joints, two universals 12' and 13' and one swivel $b'$. By the provision of the swivel joint instead of the third ball joint of the usual three joint type, I eliminate the swaying before mentioned, maintain the connection always in operative position and greatly extend its life.

In the construction of Fig. 4, I employ the same general arrangement, save that I simplify the swivels by providing a simple elbow 30 having a nipple 31 for a short length of rubber or flexible hose 32 for connection with the respective pipe 22 or 23. The hose permits of the pivotal movement of the elbow and the use of hose is permissible because of its location. It is protected from the weather and is so far removed from the road bed that hot ashes will not affect it.

I claim:

1. A flexible connection of the class described comprising a pair of substantially upright sections adapted to be suspended from the respective vehicles, a substantially horizontal section, universal joints connecting such horizontal section with the respective upright sections, and swivel means for suspending each upright section providing an axis of rotation transverse the longitudinal vertical plane of the connection.

2. A flexible connection of the class described comprising a pair of substantially upright sections adapted to be suspended from the respective vehicles, a substantially horizontal section, universal joints connecting such horizontal section with the respective upright sections, and swivel means for suspending each upright section providing an axis of rotation transverse the longitudinal vertical plane of the connection, said universal joints being in line with the respective upright sections.

3. A flexible connection of the class described comprising a pair of substantially upright sections adapted to be suspended from the respective vehicles, a substantially horizontal section, ball and socket joints connecting such horizontal section with the respective upright sections, and swivel means for suspending each upright section providing an axis of rotation transverse the longitudinal vertical plane of the connection.

4. A flexible connection of the class described comprising a pair of substantially upright sections adapted to be suspended from the respective vehicles, a substantially horizontal section, ball and socket joints connecting such horizontal section with the respective upright sections and swivel means for suspending each upright section providing an axis of rotation transverse the longitudinal vertical plane of the connection, said ball and socket joints being in line with the respective upright sections.

5. A flexible connection of the class described comprising a pair of substantially upright sections adapted to be suspended from the respective vehicles, a substantially horizontal section, universal joints connecting such horizontal section with the respective upright sections, and means for suspending each upright section including a bracket and a pivot member rotatable therein on an axis transverse the longitudinal vertical plane of the connection.

6. A flexible connection of the class described comprising a pair of substantially upright sections adapted to be suspended from the respective vehicles, a substantially horizontal section, universal joints connecting such horizontal section with the respective upright section, and means for suspending each upright section including a bracket and a hollow pivot member rotatable therein on an axis transverse the longitudinal vertical plane of the connection.

7. A flexible connection of the class described comprising a pair of substantially upright sections adapted to be suspended from the respective vehicles, a substantially horizontal section, universal joints connecting such horizontal section with the respective upright sections, and means for suspending each upright section including a bracket and a hollow pivot member rotatable therein on an axis transverse the longitudinal vertical plane of the connection, said pivot member being adapted to be connected to its respective upright section and to an adjacent part of the line.

8. A flexible connection of the class described comprising a pair of substantially upright sections adapted to be suspended from the respective vehicles, a substantially horizontal section, universal joints connecting such horizontal section with the respective upright sections, and means for suspending each upright section including a concentric pipe swivel joint having an axis of rotation transverse the longitudinal vertical plane of the connection.

9. A flexible connection of the class described comprising a pair of substantially upright sections adapted to be suspended from the respective vehicles, a substantially horizontal section, universal joints connecting such horizontal section with the respective upright sections, and means for suspending each upright section including a concentric pipe swivel joint having an axis of rotation transverse the longitudinal vertical plane of the connection and a bracket for said joint.

10. A flexible connection of the character described including two sections one of which is suspended to swing in a substantially vertical plane but substantially restrained from other swinging movement, and a universal joint between the sections.

11. A flexible connection of the character described including a pair of sections, a universal joint between sections, a joint for suspending one of the sections comprising an elbow, a bracket in which the elbow is swivelled, said elbow having a passage for the fluid and being connected with the suspended section, and a pipe connected with the elbow, said suspension joint preventing lateral swaying of the connection.

12. A flexible connection of the character described including a pair of sections, a universal joint between sections, a joint for suspending one of the sections comprising an elbow, a bracket in which the elbow is swivelled, said elbow having a passage for the fluid and being connected with the suspended section, and a pipe swivelled in the elbow, said suspension joint preventing lateral swaying of the connection.

13. In a connection of the class described a bracket, a hollow elbow swivelled in the bracket, a pipe swivelled in the elbow, and a pipe connected to the elbow.

14. In a connection of the class described a bracket, a hollow elbow swivelled in the bracket, a shouldered pipe swivelled in the elbow, a cap for the elbow, a packing between the shoulder and cap, and a pipe connected to the elbow.

In testimony whereof, I have hereunto signed my name.

MONTAGUE H. ROBERTS.